US011197570B2

(12) United States Patent
Shoham et al.

(10) Patent No.: US 11,197,570 B2
(45) Date of Patent: Dec. 14, 2021

(54) COMPACT COLD-PRESS GRINDER

(71) Applicant: GreenOnyx LTD, Ganey Tikva (IL)

(72) Inventors: Benjamin Shoham, Ganey Tikva (IL); Moshe Peles, Lapid (IL); Tsipi Shoham, Ganey Tikva (IL)

(73) Assignee: GreenOnyx LTD, Tel Aviv (IL)

( * ) Notice: Subject to any disclaimer, the term of this patent is extended or adjusted under 35 U.S.C. 154(b) by 397 days.

(21) Appl. No.: 15/940,500

(22) Filed: Mar. 29, 2018

(65) Prior Publication Data
US 2018/0279664 A1    Oct. 4, 2018

Related U.S. Application Data

(60) Provisional application No. 62/478,475, filed on Mar. 29, 2017.

(51) Int. Cl.
*A47J 19/06*     (2006.01)
*A23N 1/02*     (2006.01)
*B30B 9/20*     (2006.01)
*A47J 43/044*   (2006.01)

(52) U.S. Cl.
CPC .............. *A47J 19/06* (2013.01); *A23N 1/02* (2013.01); *A47J 43/044* (2013.01); *B30B 9/20* (2013.01);
(Continued)

(58) Field of Classification Search
CPC ............ A47J 43/044; A47J 19/06; A23N 1/02
(Continued)

(56) References Cited

U.S. PATENT DOCUMENTS

| 2,159,259 A | * | 5/1939 | Dootson | .............. A47G 19/24 241/95 |
| 2,535,913 A | * | 12/1950 | Galvin | .............. A47G 19/24 222/142.6 |

(Continued)

FOREIGN PATENT DOCUMENTS

KR         1916747        * 11/2018     .............. A47J 19/06

OTHER PUBLICATIONS

Will, "Roller Mill Grinders: Advantages, limitations and how roller mill grinders are changing for the better," Grain & Feed Milling Technology (Mar.-Apr. 2010), pp. 18-20; https://www.mpechicago.com/wp-content/uploads/2019/12/gfmt10-02f2ds.pdf.

(Continued)

*Primary Examiner* — Faye Francis
(74) *Attorney, Agent, or Firm* — Sterne, Kessler, Goldstein & Fox P.L.L.C.

(57) ABSTRACT

A compact cold press grinder that fits within a user's hand that includes a cold press grinder and a container that holds consumables, such as fruits, vegetables, seeds, aquatic plants, and/or other nutritious consumable. The cold press grinder crushes and grinds the consumables to a liquid paste or juice using friction forces, shear forces and pressure (e.g. hydraulic press). The cold press grinder includes a housing that is removably attachable to the container. The cold press grinder may include an input for receiving the consumables within the container and a plurality of nip roller pairs that grind the consumables. The cold press grinder has one output to output the consumable as is or the liquid paste or the juice prepared by the cold press grinder and does not include an output to output consumable waste products.

24 Claims, 10 Drawing Sheets

(52) U.S. Cl.
CPC ............... *A47J 2043/04409* (2013.01); *A47J 2043/04436* (2013.01)

(58) Field of Classification Search
USPC .................................... 241/168, 286, 152.1
See application file for complete search history.

(56) References Cited

U.S. PATENT DOCUMENTS

| | | | | |
|---|---|---|---|---|
| 2,712,926 | A * | 7/1955 | Von Elm | 366/250 |
| 3,704,864 | A * | 12/1972 | Lee | B01F 7/162 366/205 |
| 3,991,947 | A * | 11/1976 | Schlessel | A47J 42/04 241/169.1 |
| 5,662,281 | A * | 9/1997 | Wollert | A61M 5/3278 241/100 |
| 5,797,313 | A * | 8/1998 | Rothley | A47J 31/402 222/129.4 |
| 7,032,851 | B2 * | 4/2006 | Demske | A61J 7/0007 241/221 |
| 8,382,017 | B2 * | 2/2013 | Bich | A47J 42/50 241/169.1 |
| 8,469,586 | B2 * | 6/2013 | Schleinzer | A47J 43/046 366/202 |
| 8,613,402 | B2 * | 12/2013 | Lefkovitz | A47J 19/06 241/100 |
| 8,727,253 | B2 * | 5/2014 | Smith | B02C 4/02 241/152.1 |
| 8,740,116 | B2 * | 6/2014 | Lefkovitz | B65D 33/2591 241/169.1 |
| 9,173,525 | B2 * | 11/2015 | McGill | A47J 43/06 |
| 9,301,636 | B2 * | 4/2016 | Varnum | A47J 31/38 |
| 9,364,806 | B2 * | 6/2016 | King | B01F 15/00409 |
| 9,493,298 | B2 * | 11/2016 | Evans | A47J 31/407 |
| 9,737,092 | B2 * | 8/2017 | Grumbacher | A24C 5/40 |
| 9,764,295 | B2 * | 9/2017 | Juan | B01F 3/1221 |
| 10,046,904 | B2 * | 8/2018 | Evans | B65D 77/04 |
| 2006/0198241 | A1 * | 9/2006 | Krishnachaitanya | A47J 43/0722 366/205 |
| 2007/0284290 | A1 * | 12/2007 | Han | B65B 69/00 209/133 |
| 2008/0185463 | A1 * | 8/2008 | Schlesinger | C09D 7/69 241/19 |
| 2009/0109793 | A1 * | 4/2009 | Xue | A47J 43/0716 366/205 |
| 2009/0238928 | A1 * | 9/2009 | Bernauer | A23G 1/0033 426/231 |
| 2011/0186669 | A1 * | 8/2011 | Bower | A47J 43/0727 241/101.2 |
| 2012/0288161 | A1 * | 11/2012 | Sayers | A01G 7/00 382/110 |
| 2012/0318899 | A1 * | 12/2012 | Barnett | B02C 19/0087 241/60 |
| 2013/0200183 | A1 * | 8/2013 | Lefkovitz | A47J 19/06 241/25 |
| 2015/0028141 | A1 * | 1/2015 | Federighi | A47J 43/044 241/169.2 |

OTHER PUBLICATIONS

"Fritsch Mortar Grinder," YouTube (dated Apr. 11, 2011); https://www.youtube.com/watch?v=ZP01Ccll6Eg.

"Mortar Grinder RM 200—RETSCH," YouTube (dated Nov. 16, 2011); https://www.youtube.com/watch?v=0W0kpDra8pU.

"Mini Oil Press," YouTube (dated Nov. 19, 2011); https://www.youtube.com/watch?v=x 11PFswKfYU.

"Manual matcha grinding by hand with grinding stone at Fukujuen, Uji (Japan)," YouTube (dated May 13, 2012); https://www.youtube.com/watch?v=J-yiYQxVles.

"Practical Roll Techniques: Nip & Crown," Valmet Technical Paper Series (Jun. 14, 2013), pp. 1-18; http://www.valmet.com/globalassets/media/downloads/white-papers/roll-services/wpr_nipandcrown.pdf.

"High-Pressure Grinding: Specialists in High-Pressure Communication," Köppern, published Mar. 2014, pp. 1-24; http://www.koeppern-international.com/uploads/media/High-Pressure_Grinding.pdf.

"Mortar grinder, Auto mortar and pestle Fisher Sci," YouTube (dated Jul. 7, 2014); https://www.youtube.com/watch?v=yLNxR7EL6HM.

"How it works, Pepper Grinder," YouTube (dated Sep. 29, 2014); https://www.youtube.com/watch?v=b4HRLTVtAYM.

"Automatic Salt & Pepper Mill Grinder," YouTube (dated Jul. 7, 2015); https://www.youtube.com/watch?v=IMFdeYZ1loQ.

"Hand Carved Stone Grain Mill," YouTube (dated Oct. 11, 2015); https://www.youtube.com/watch?v=1MFRWyqK5VI.

Marcotte, "Distillery milling efficiency," Processing Magazine (Feb. 5, 2016); http://www.processingmagazine.com/distillery-milling-efficiency/.

"Commercial Cold Press Juicer. The Fresh Press—Model FP100," YouTube (dated Apr. 14, 2016); https://www.youtube.com/watch?v=k0Jremy99ZI.

"Hurom H26 Alpha Cold Press Juicer—Technology," YouTube (dated Apr. 14, 2016); https://www.youtube.com/watch?v=ge_IU2yS3UO.

"Kharal / kharl /Kharal Machine / mortar and pestle machine / Herbs Grinder / kushta making machine," YouTube (dated May 31, 2016); https://www.youtube.com/watch?v=T9n8pWKQOzc.

"Kharal Machine / Mortar Grinder / End runner / Herbs Grinder / Electric kharal machine in Pakistan," YouTube (dated Jun. 18, 2016); https://www.youtube.com/watch?v=nWRdUBZUHVE.

"The Hurom Juicer Principles of Extraction," YouTube (dated Jul. 20, 2016); https://www.youtube.com/watch?v=f0KIGa7qrto.

"Woman sat cross-legged using hand-turned millstone to grind wet rice for making soaked rice flour ( close up )," Shutterstock (available at least as early as Mar. 29, 2017); http://www.shutterstock.com/video/clip-14195168-stock-footage-woman-sat-cross-legged-using-hand-turned-millstone-to-grind-wet-rice-for-making-soaked-rice-flour.html?src=search/pQGRynZnVj6DjarjuzIINA:1:16/gg.

"Particle Size Reduction For Animal Feeds: Part 2," Feed Machinery (available at least as early as Mar. 29, 2017); http://www.feedmachinery.com/articles/feed_technology/particle_reduction2/.

"Mill & Mix Roller/Crusher Mills Page," Danagri-3S (available at least as early as Mar. 29, 2017); http://www.danagri-3s.com/mandm_rollermills.html.

"Flour Milling History: What Makes Bread Rise?" Oldrecipebook.com (available at least as early as Mar. 29, 2017); http://oldrecipebook.com/history-flourmilling.shtml.

Secrest, "Flour," Madehow.com (available at least as early as Mar. 29, 2017); http://www.madehow.com/Volume-3/Flour.html.

* cited by examiner

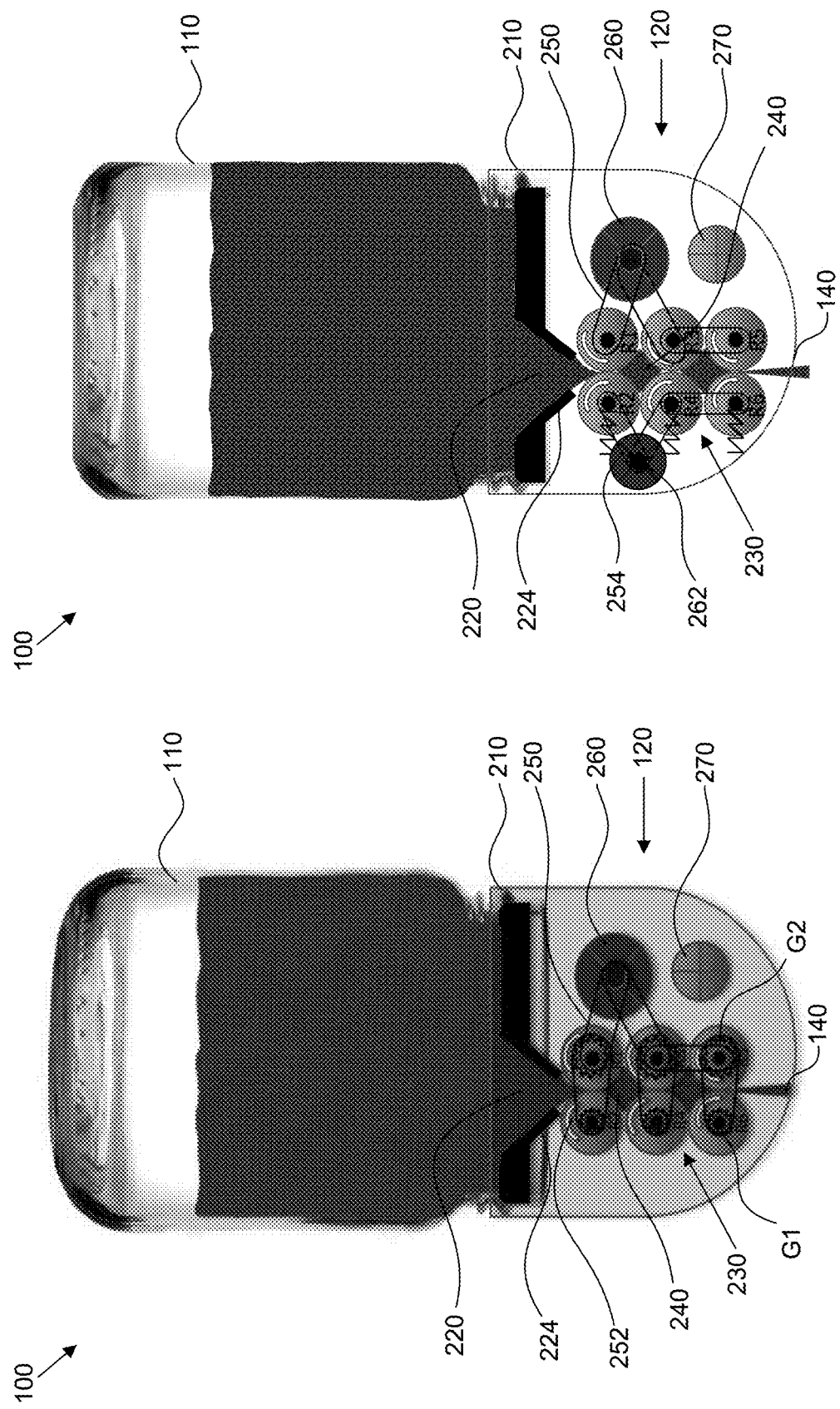

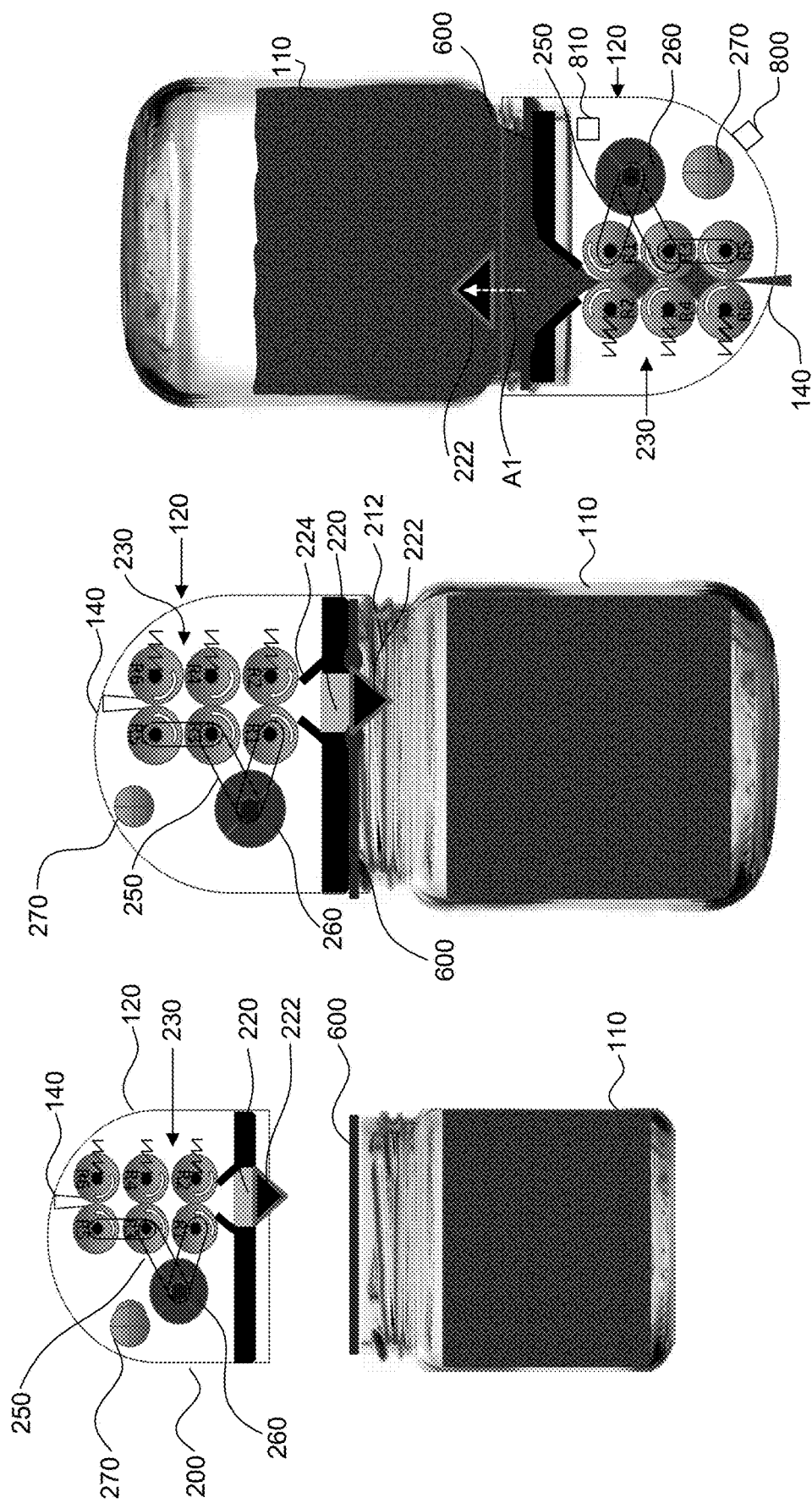

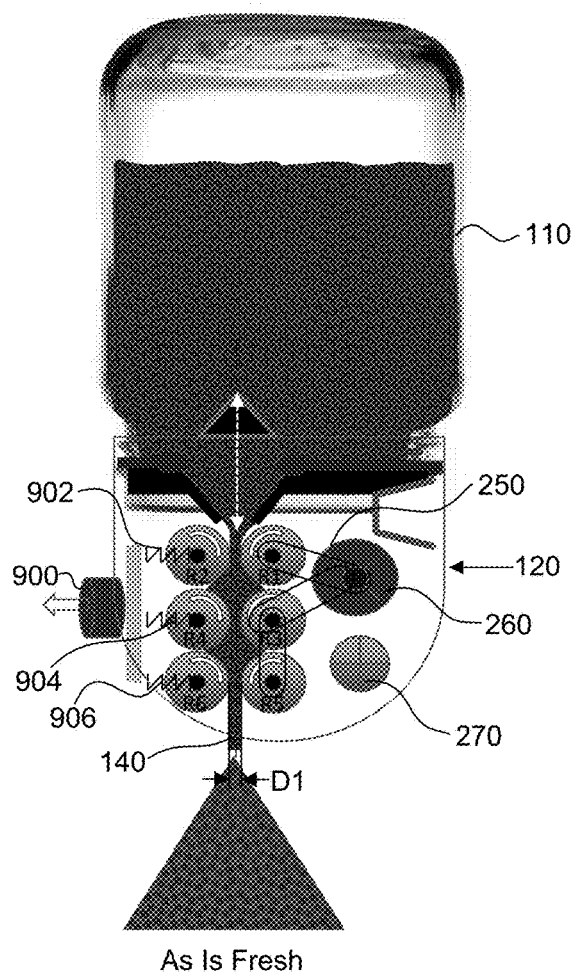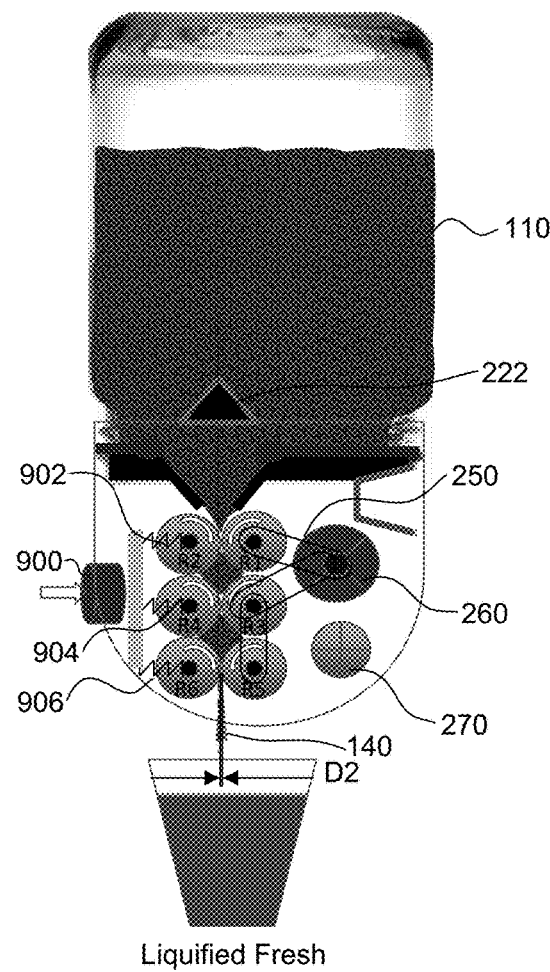
FIG. 9
FIG. 10

COMPACT COLD-PRESS GRINDER

CROSS-REFERENCE TO RELATED APPLICATIONS

This application claims priority to U.S. Provisional Application No. 62/478,475, filed Mar. 29, 2017, which is incorporated herein in its entirety by reference thereto.

BACKGROUND OF THE INVENTION

Field of the Invention

Embodiments of the invention generally relate to a system for crushing, grinding, and juicing fruits, vegetables, seeds (e.g., cereals and legumes), and/or aquatic plants. In particular, embodiments relate to a handheld grinder or masher.

Background Art

The global rise of non-infectious chronic and degenerative diseases, such as cardiovascular diseases, type II diabetes, asthma, cancer, dementias, hypertension, osteoporosis, attention deficit disorder (ADD) and attention deficit hyperactivity disorder (ADHD) may be directly linked to unhealthy diets resulting from a high consumption of processed food with low nutritious qualities. Thus, the World Health Organization (WHO) published recently new guidelines for a healthy diet, specifying the need to increase consumption of fresh fruits and vegetables targeting at least 400 gr/day/person (noting that potatoes and other starchy roots are not classified as vegetables), increase consumption of dietary fibers, such as whole grains, and reduce consumption of foods high in energy, fats, free sugars, or salt/sodium. As such, there is an increasing desire for more nutritious foods that meet the WHO new guidelines. This has led to the rapid global development of the health and wellness food market. Convenient systems and methods for on-site instant preparation of nutritious real foods, using minimal processing steps, time, overhead and effort, are needed.

BRIEF SUMMARY OF THE INVENTION

Some embodiments of the present invention include a compact grinder that fits within a user's hand. The compact grinder includes a container that holds consumables, such as fruits, vegetables, seeds (e.g., cereals and legumes), aquatic plants, and/or other nutritious consumables and a grinder that crushes and grinds the consumables into a rough or fine liquid paste using friction forces and/or shear forces and/or pressure (e.g., hydraulic pressure). The grinder includes a grinder housing that is removably attachable to the container. The housing houses the mechanical and electrical components of the grinder. In some embodiments, the container and the grinder may be ergonomically shaped to fit within the user's hand and enable the user to easily grip the compact grinder and control the crushing and grinding process.

In some embodiments, the grinder housing includes at least one input or intake for receiving the consumables within the container and introduces the consumables to a crushing and grinding mechanism. The crushing and grinding mechanism includes a plurality of nip roller pairs that grind the consumables into a rough or smooth liquid paste or juice. The grinder has one output to output the paste (rough paste or smooth liquid paste) or juice prepared by the grinder and does not include an output to output consumable waste product. In other words, the entire consumable is outputted.

In some embodiments, each nip roller pair includes a drive roller and an idle roller. The roller pairs are arranged between the at least one input and the at least one output of the grinder. The distance between drive roller and the idle roller helps determine the amount of force applied by the nip roller pair during the crushing and grinding process. In some embodiments, the distance between the rollers of each roller pair is the same. In some embodiments, the distance between the rollers of each roller pair is different. In some embodiments, the user is able to alter the distance between the rollers of each roller pair by a biasing mechanism. In some embodiments, the material of the nip rollers in each roller pair may be cohesive so that small bits/fragments of the nip roller do not mix in with the ingredients. The material and/or the surface texture/roughness for the nip rollers may be smooth and non-porous so as to not absorb or trap the consumables being ground. In addition, the material and/or the nip roller surface texture/roughness may be determined according to the desired friction forces. In some embodiments, only the first rollers' material may provide high friction forces for crushing the consumables. In some embodiments, the material and/or the surface texture/roughness of the rollers of each roller pair is different in order to apply different friction forces. In some embodiments, the material and/or the surface texture/roughness of the rollers of each roller pair is the same.

In some embodiments, each nip roller in some or all nip roller pairs rotate at different speeds to generate shear forces in the crushing and grinding mechanism and to generate different conveying speeds. Each nip roller in some or all nip roller pair may have a gear with a diameter different from the other roller in the pair. A drive system drives both nip rollers and due to the different gear diameters, each nip roller rotates at a different speed, thus generating shear forces and different conveying speeds.

In some embodiments, each nip roller of each nip roller pair is activated by a different motor and each motor rotates its respective nip roller at a different speed. Shear forces are generated by rotating each nip roller in the pair at different speeds.

In some embodiments, the grinder includes a funnel that gradually introduces the consumables to the plurality of nip rollers.

In some embodiments, the grinder includes a valve that controls the flow of the consumables to the plurality of nip rollers. In some embodiments, the valve includes a piercer for piercing a seal of the consumables container. In some embodiments, the valve moves from a first position to a second position to open the input to introduce the consumables to the plurality of nip rollers.

In some embodiments, the grinder includes a secondary input for cleaning the crushing and grinding mechanism. The secondary input may be located in the grinder housing and is orthogonal to the input.

In some embodiments, the compact grinder includes an orientation sensor that determines the orientation of the compact grinder. The valve opens when the compact grinder tilts more than a predetermined angle.

In some embodiments, the compact grinder includes a motor that drives the plurality of rollers. The motor drives the plurality of rollers for a predetermined amount of time to produce a predetermined amount of output.

Some embodiments are directed to a handheld cold-press grinder for aquatic plants, the handheld cold-press grinder including a container containing aquatic plants and a cold-press grinder with a housing that is removably attachable to the container, the housing being configured to be received in a user's hand and the cold-press grinder including an input for receiving the aquatic plants of the container, a cold-press grinding mechanism configured to grind the aquatic plants of the container by applying pressure and shear forces to the aquatic plants, and an output to output a liquid paste prepared by grinding the aquatic.

In some embodiments, the cold-press grinder may have only has a single output to output the liquid paste.

In some embodiments, the cold-press grinding mechanism may include a plurality of nip roller pairs. In some embodiments, the nip roller pairs are be arranged between the input and the output of the cold-press grinder. In some embodiments, the distance between the rollers of each roller pair is the same as the other roller pairs during a grinding process. In some embodiments, the distance between the rollers of each roller pair is different than the other roller pairs during a grinding process. In some embodiments, one roller of each roller pair is biased by a biasing member and the biasing member controls the distance between the rollers of each roller pair.

In some embodiments, the input of the cold-press grinder may include a funnel to gradually introduce the aquatic plants of the container to the cold-press grinding mechanism.

In some embodiments, the input of the cold-press grinder may include a valve to control the flow of the aquatic plants of the container to the cold-press grinding mechanism. In some embodiments, the valve may include a piercer for piercing a seal of the container. In some embodiments, the valve may rotate to control the flow of the aquatic plants of the container to the cold-press grinding mechanism. In some embodiments, the valve may move from a first position to a second position to control the flow of the aquatic plants of the container to the cold-press grinding mechanism.

In some embodiments, the cold-press grinding mechanism is disposed between the input and the output along an aquatic plant pathway, and a predefined measure of the aquatic plants is conveyed along the aquatic plant pathway without being crushed or ground by the cold-press grinding mechanism.

In some embodiments, a sidewall of the container may have a contour shape that conforms to the shape of a user's hand.

In some embodiments, a top of the grinder housing and a bottom of the container may be adapted to fit within a user's hand.

In some embodiments, the handheld cold-press grinder may include a secondary input, and the secondary input may be disposed at an angle relative to the input.

In some embodiments, the handheld cold-press grinder may include an orientation sensor that detects the orientation of the handheld grinder and opens a valve when the handheld grinder tilts more than a predetermined angle.

In some embodiments, the handheld cold-press grinder may include a motor that drives the cold-pressed grinding mechanism, where the motor drives the cold-pressed grinding mechanism for a predetermined amount of time to produce a predetermined amount of liquid paste.

In some embodiments, the cold-press grinding mechanism may include a plurality of nip roller pairs and the cold-press grinder may include a motor that drives a plurality of the nip rollers of the nip roller pairs, where the motor drives the plurality of nip rollers for a predetermined amount of time to produce a predetermined amount of liquid paste.

In some embodiments, the cold-press grinding mechanism may include a mortar and pestle-like mechanism.

Some embodiments are directed to a cold-press grinder for grinding an aquatic plant, the cold-press grinder including a housing that includes an input, an aquatic plant pathway, and an output; a valve for controlling the flow of the aquatic plant through the input; and a cold-press grinding mechanism disposed between the input and the output along the aquatic plant pathway, where the cold-press grinding mechanism is configured to grind aquatic plant by applying pressure and shear forces to the aquatic plant.

In some embodiments, the cold-press grinding mechanism may include a plurality of nip roller pairs.

In some embodiments, the cold-press grinder may be detachably attachable to a container that holds the aquatic plant.

In some embodiments, the cold-press grinding mechanism may include a plurality of nip roller pairs and the distance between the rollers in each roller pair is adjustable before or during a grinding process.

In some embodiments, the cold-press grinder may include a cleaning input separate from the input for introducing a cleaning solution to clean the cold-press grinding mechanism.

Some embodiments are directed to a handheld cold-press grinder including a container and a cold-press grinder that is removably attachable to the container, the cold-press grinder including an input for receiving the contents of the container, an output to output the contents of the container, a content pathway located between the input and the output, and a plurality of nip roller pairs located along the content pathway.

In some embodiments, the distance between the nip rollers of each nip roller pair may be adjustable by a user.

In some embodiments, a predefined measure of the contents of the container are conveyed along the content pathway from the input of the grinder to the output of the grinder without being crushed or ground by the plurality of nip roller pairs.

In some embodiments, the contents of the container are crushed and ground by the plurality of nip roller pairs to produce a liquid paste that is outputted through the output.

In some embodiments, the distance between the nip rollers of each nip roller pair is adjustable by the user to define the thickness of the liquid paste produced by the nip roller pairs.

BRIEF DESCRIPTION OF THE DRAWINGS/FIGURES

Some features herein are illustrated by way of example, and not by way of limitation, in the accompanying drawings. In the drawings, like numerals reference similar elements between the drawings.

FIG. 2B illustrates a schematic drawing of a grinder according to an embodiment.

FIG. 2C illustrates a schematic drawing of a grinder according to an embodiment.

FIG. 6 illustrates a schematic drawing of a grinder and a container that are not attached according to an embodiment.

FIG. 7 illustrates a schematic drawing of a grinder attached to a container according to an embodiment.

FIG. 8 illustrates a schematic drawing of a grinder attached to a container that outputs a paste (rough paste or smooth liquid paste) according to an embodiment.

FIG. 9 illustrates a schematic drawing of a grinder in an open mode attached to a container that outputs consumables in a substantially unaltered manner.

FIG. 10 illustrates a schematic drawing of a grinder attached to a container that outputs consumables as a paste (rough paste or smooth liquid paste).

DETAILED DESCRIPTION OF THE INVENTION

Figure 1A:
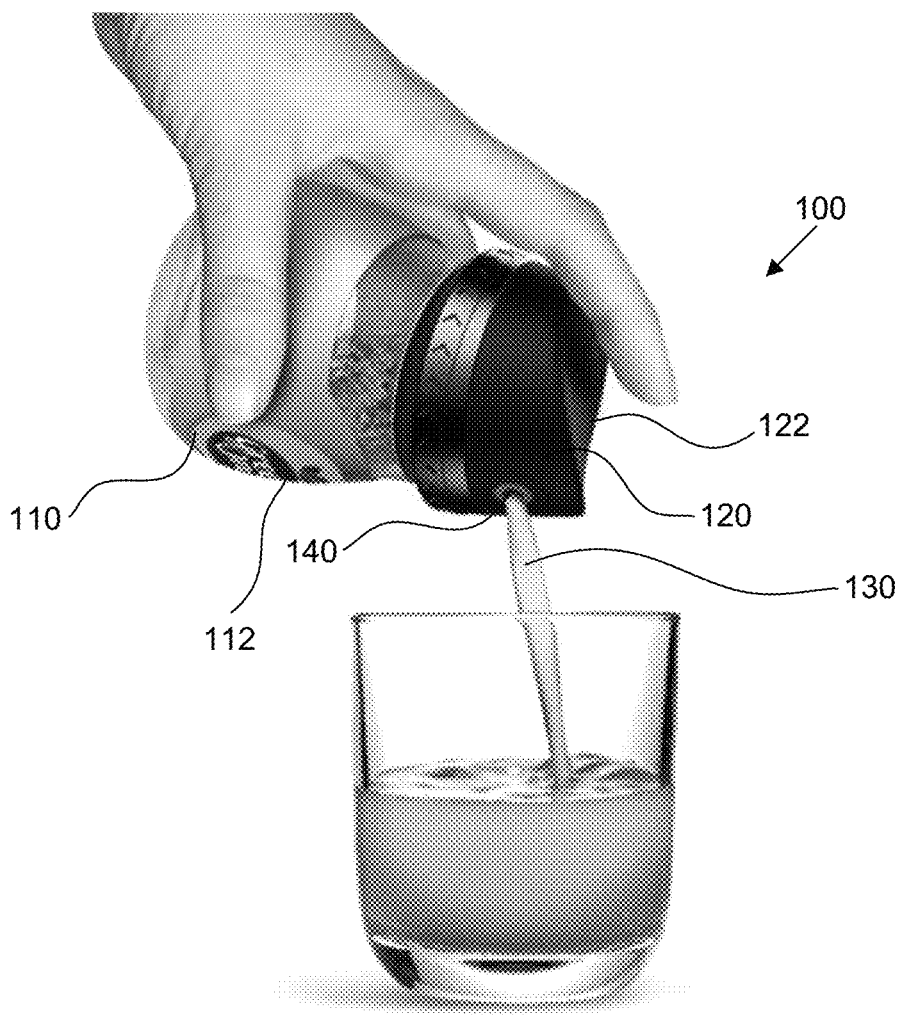
FIG. 1A illustrates a crushing and grinding system for crushing and grinding consumables according to an embodiment.

The present inventions will now be described in detail with reference to embodiments thereof as illustrated in the accompanying drawings, in which like reference numerals are used to indicate identical or functionally similar elements. References to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following examples are illustrative, but not limiting, of the present inventions. Other suitable modifications and adaptations of the variety of conditions and parameters normally encountered in the field, and which would be apparent to those skilled in the art, are within the spirit and scope of the inventions.

In order to meet the demand for nutritious foods, convenient devices and methods for preparing and consuming these foods are needed. Nutritious food preparations should be based on methodologies that preserve nutrients content and activity as much as possible, e.g. cold pressed grinding using pestle and a mortar, at minimal processed steps for immediate/quick use and consumption. A handheld grinding system 100 provides for efficient juicing and grinding of fruits, vegetables, seeds (e.g., cereals and legumes) and/or aquatic plants. Grinding refers to crushing, mashing, etc., of the consumable whereas juicing refers to extracting, e.g., squeezing, the natural liquid of a consumable. In one embodiment grinding system 100 may include a container 110 for holding and storing the consumable and a grinder 120 for juicing and/or grinding the consumable to a desired consumable grinding or juicing state. Grinding system 100 may be particularly useful for use with consumables that produce little or no non-consumable waste during the grinding process.

Grinder 120 may be a cold-press grinder including a cold-press grinding mechanism configured to grind a consumable in container 110 by applying pressure and shear forces to the consumable. The pressure and shear forces applied by the cold-press grinding mechanism may turn the consumable to a liquid paste that is dispensed from an output of handheld grinding system 100. Cold-press grinding mechanism of grinder 120 may include nip roller pairs, a grinding stone, toothed grinding wheels, a mortar and pestle or mortar and pestle-like mechanism, or other types of cold-press mechanisms for applying pressure and shear forces to a consumable.

The cold-press grinding mechanism of grinder 120 may be devoid of blades or other cutting mechanisms for grinding a consumable. Rather than apply cutting forces, the cold-press grinding mechanism of grinder 120 applies pressure and shear forces to grind a consumable. The pressure and shear forces crush the consumable rather than cut or chop it into pieces. The combination of pressure and shear forces applied by the cold-press grinding mechanism converts a consumable to a liquid paste while simultaneously moving the consumable through the cold-press grinding mechanism and towards an output of handheld grinding system 100. In some embodiments, the cold-press mechanism may define all or a portion of a content pathway between the input and output of grinder 120 for conveying consumable from the input to the output. Also, the cold-press grinding mechanism of grinder 120 may function to turn a consumable to a liquid paste without the addition of an external fluid, such as water, while the intrinsic water content of the consumable being ground by the cold-press grinding mechanism defines the water content of the liquid paste created by the cold-press grinding mechanism.

FIG. 1A illustrates grinding system 100 for juicing and/or grinding various consumables, such as fruits, vegetables, and/or aquatic plants according to an embodiment of the present invention. In one embodiment, grinding system 100 may provide portable, on-demand, easy to use, crushing and pressing (i.e., hydraulic press) grinding. Grinding system 100 may include container 110 (e.g., a bottle) for holding and storing the consumables and grinder 120 attaches to container 110. Container 110 and grinder 120 may be separate components that may be removably attached or may be integrally connected to each other. Container 110 includes an opening near the top of container 110 for placing and storing various types of consumables within container 110. Grinder 120 may remain attached and kept on container 110 until all of the consumables within container 110 have been processed by grinder 120. Alternatively, container 110 may have a separate lid (not shown) for storing the consumables when grinder 120 is not attached to container 110. User may have multiple containers 110, each with a different type of consumable within. Alternately, the user may remove grinder 120 from one container 110 and attach grinder 120 to a different container 110. The separate lid may help preserve the consumables when grinder 120 is not attached.

Figure 1B:
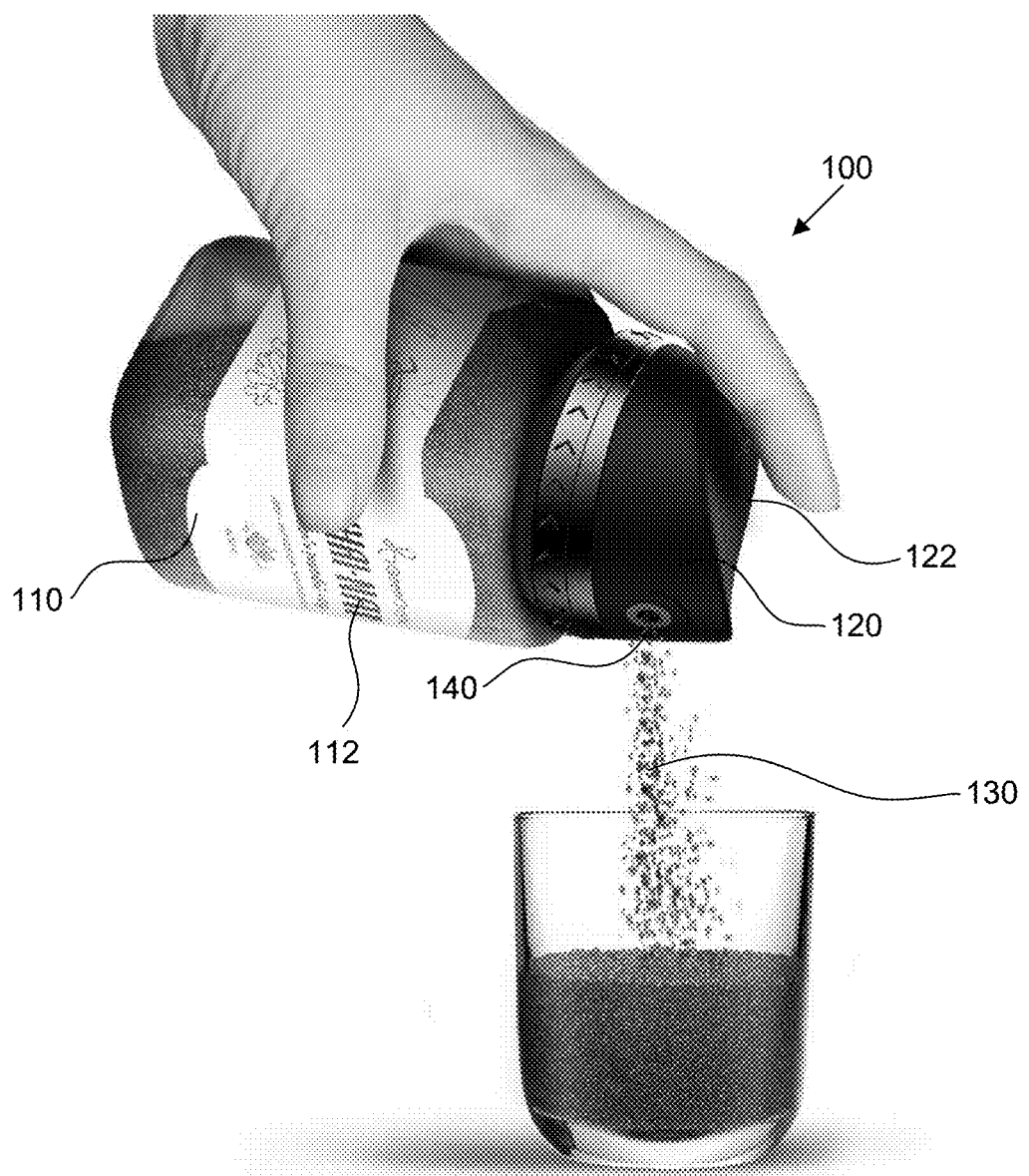
FIG. 1B illustrates a crushing and grinding system that outputs the consumables as is without crushing or grinding the consumable according to an embodiment.

Grinder 120 is adapted to crush and/or grind the consumables within container 110 into a paste (rough paste or smooth liquid paste) or juice 130 and output paste (rough paste or smooth liquid paste) or juice 130 for consumption. Alternatively, the consumables within container 110 may be outputted "as is," as illustrated in FIG. 1B, without processing the consumables with grinder 120.

Grinder 120 may use various methods to crush and grind the consumables. For example, grinder 120 may use cold pressure, a hydraulic press, squeezing forces, pestle and mortar forces, and nip rollers to comminute, mix, and homogenize the consumables. The use of cold pressure preserves the fresh taste and original nutrients of the consumable, e.g. fruits, vegetables, and/or aquatic plants, and limits the creation of undesirable heat in the grinding process. Consumables may be outputted directly from grinder 120 into a cup, glass, or another container. In one embodiment, the user may combine the outputted paste (rough paste or smooth liquid paste) or juice 130 with another product.

Grinder 120 may seal the consumables within container 110 when grinder 120 is attached to container 110. The seal preserves the freshness of the consumables and keeps the consumables hygienic within container 110. The seal also prevents leaks during the grinding process. For example, when grinding system 100 is turned upside down, gravity leads the consumables within the container to grinder 120. The mechanical seal between container 110 and grinder 120 may prevent or limit the consumables from leaking out of grinding system 100 when grinding system 100 is turned upside down.

According to one embodiment, grinding system 100 is configured to fit into a palm of a user's hand. For example, a length between the top of grinder 120 and the bottom of container 110 fits within an average length of a user's hand. Since the entire grinding system 100 easily fits into the palm of the user's hand, grinding system 100 is portable, enabling the user to take grinding system 100 in a bag on the go.

In addition, container 110 may be ergonomically shaped to fit within the user's hand. For example, the sides of container 110 may have a contoured shape that bulges 112 toward the bottom of container 110. Grinder 120 includes a housing 200 that may be ergonomically shaped to fit within the user's hand. For example, a top surface 122 of grinder housing 200 may have a semi-circular arc that allows the user's figures to grasp grinder 120. The top of grinder housing 200 may include various controls for controlling grinder 120 that may be manipulated by the user while the user grips grinding system 100.

Grinding system 100 may process various kinds of consumables. For example, grinding system may grind vegetables, fruit, seeds, aquatic plants (e.g., marine or fresh water), or a variety of other nutritious consumables. Examples of aquatic plants that may be ground by grinding system 100 include, but are not limited to, *algae, Spirodela, Landoltia, Lemna, Wolffiella, Wolffia*, or any plant from the Lamnaceae (duckweed) family. For example, Khai-Nam is a type of aquatic plant in which the entire plant may be consumed as a whole and does not have waste products (e.g., husks, pulp, rind, chaff, etc.). In one embodiment, grinder 120 only has at least one output 140 for outputting paste (rough paste or smooth liquid paste) 130. Grinder 120, however, does not have an output for outputting waste products of the consumables so the entire consumable is used in the grinding process. Accordingly, there is no need for a second output to output undesirable waste product such as husks, pulp, rind, chaff, etc. as no waste products are produced. In an exemplary embodiment, as illustrated in FIG. 1A, grinder 120 has a single output 140 for outputting paste 130.

Figure 2A:
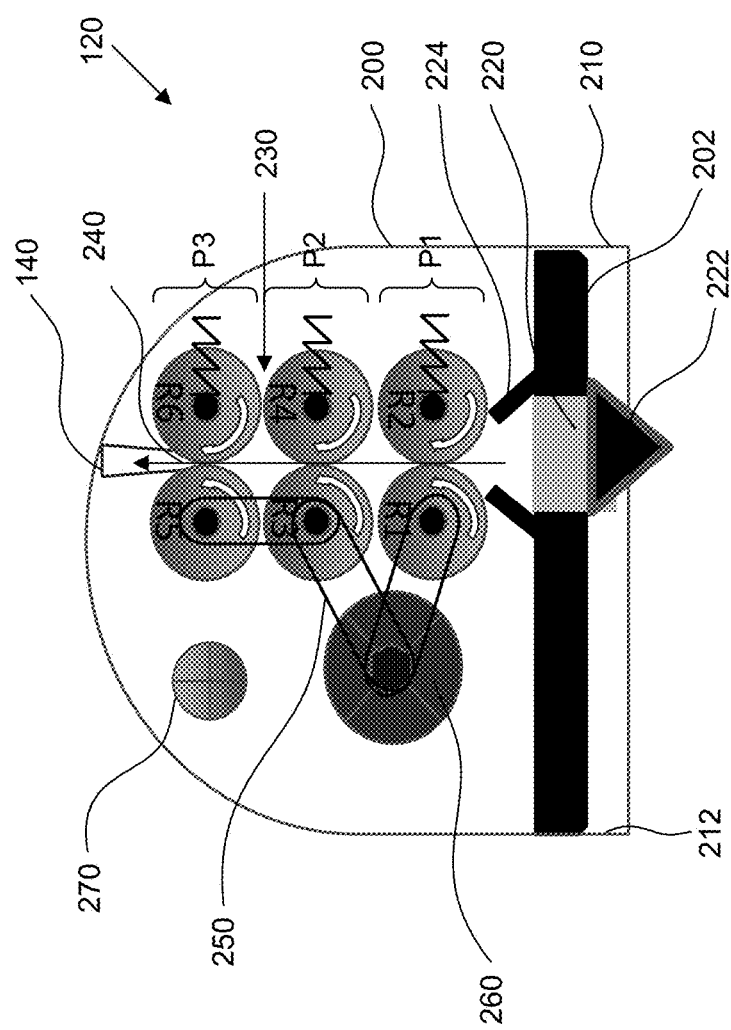
FIG. 2A illustrates a schematic drawing of a grinder according to an embodiment.

FIG. 2A illustrates an exemplary embodiment of grinder 120 with grinder housing 200. Grinder housing 200 houses all of the mechanical and electrical components of grinder 120. As described previously, the outer shape of grinder housing 200 may be contoured so that grinder housing 200 may ergonomically fit within the user's hand.

Figure 3:
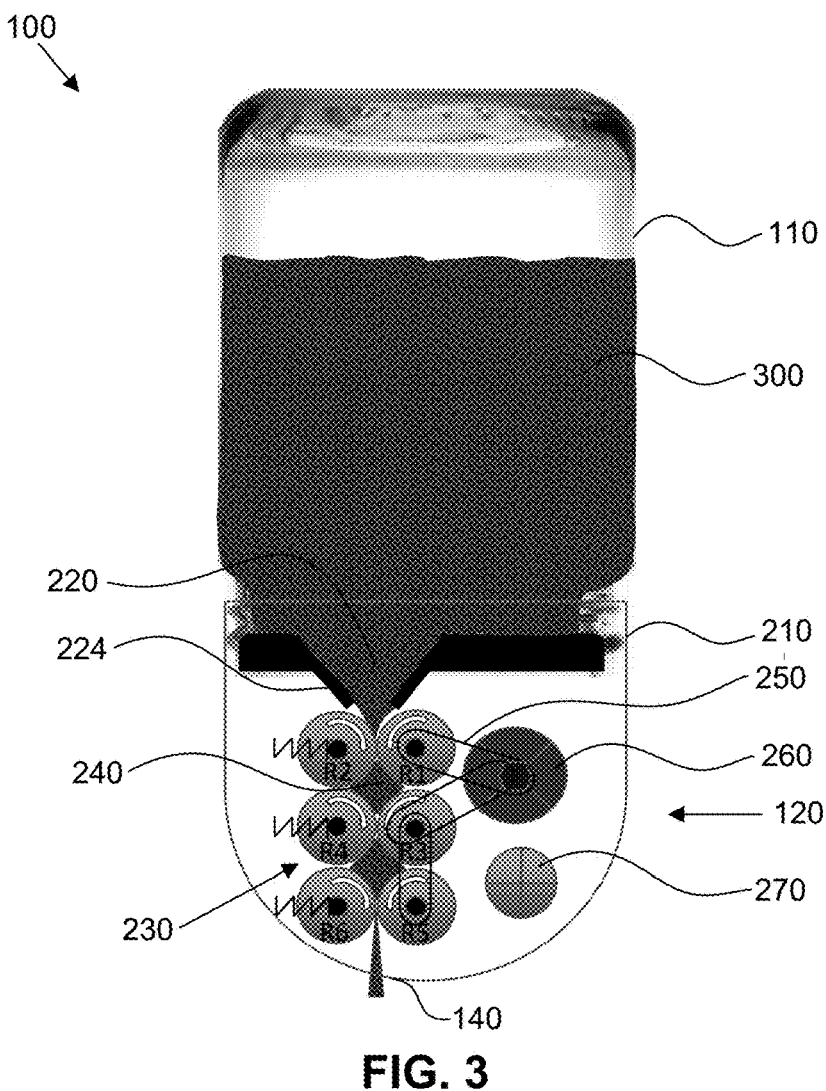
FIG. 3 illustrates a schematic drawing of a grinder attached to a container according to an embodiment.

In one embodiment, attachment mechanism 210 attaches grinder housing 200 to container 110 to provide a mechanical connection between grinder 120 and container 110. Various types of attachment mechanisms 210 may be used. Examples of attachment mechanisms 210 may include a press fit between grinder housing 200 and container 110, a lighting-type or swing-type closure, corresponding threads between grinder housing 200 and container 110 to provide a threaded engagement, and other suitable attachment mechanisms. Container 110 may have external threads or internal threads in a neck region of container 110 that correspond with internal or external threads of grinder housing 200. For example, FIG. 3 illustrates container 110 with external threads in a neck region of container 110. As described previously, attachment mechanism 210 may include a mechanical seal 212 that seals container 110 and grinder 120 and preserves the consumables within container 110 and prevents the consumables from leaking out of container 110. In one embodiment, seal 212 may include O-ring or gasket or similar component.

The grinding process includes introducing the consumables within container 110 to grinder 120. In one embodiment, the grinding process may be accomplished by turning grinding system 100 upside down and drawing the consumables in container 110 to an input or intake 220 in grinder housing 200 by gravity. Once the consumables enter input 220, they follow a consumable flow path 240 and are processed by a grinding mechanism 230. As described previously, grinder 120 may employ a variety of different kinds of methods to crush or grind the consumables. After the consumables are crushed, the consumables exit the grinder 120 through at least one output 140. Consumable flow path 240 may be a straight path from input 220 to at least one output 140. Alternatively, consumable flow path 240 may be curved or may have a slight incline to help the flow of the grinding process.

Grinder 120 may have one or more inputs or intakes for introducing the consumables within container 110 to grinding mechanism 230. For illustration purposes only, a single input is shown in FIG. 2A; however, grinder housing 200 may define multiple inputs. Input 220 is an opening in a bottom surface 202 of grinder housing 200. Bottom surface 202 may be recessed into grinder housing 200 in order to provide space for attachment mechanism 210. Input 220 may further include a valve 222 that seals input 220 and prevents consumables from entering input 220 until valve 222 is opened. Once valve 222 is opened, valve 222 meters the consumables through input 220 and introduces the consumables to consumable flow path 240. The opening and closing of valve 222 controls the start and stop of the grinding process and may be controlled by the user. Input 220 may further include a funnel 224 that further helps meter the flow of the consumables along consumable flow path 240 by gradually introducing the consumables to grinding mechanism 230. When the user has finished grinding the consumables, valve 222 may be closed to prevent further consumables from entering consumable flow path 240.

In accordance with one embodiment, grinding mechanism 230 may provide a cold press grinding process. In one embodiment, grinding mechanism 230 may include a plurality of nip rollers for grinding, crushing, and squashing the consumables to the desired output, even to a very homogenized smooth liquid mash. Grinding mechanism 230 may include a desired combination of nip rollers for providing an efficient grinding process. In one embodiment, grinding mechanism 230 includes a plurality of nip rollers R1, R2, R3, R4, R5, and R6 that are used for squeezing and crushing the consumables. Nip rollers R1, R2, R3, R4, R5, and R6 are paired into nip roller pairs P1, P2, and P3 that are arranged in series. Roller pair P1 includes nip rollers R1 and R2, roller pair P2 includes nip rollers R3 and R4, and nip roller pair P3 includes nip rollers R5 and R6. Nip roller pairs P1, P2, and P3 generate pressing forces and tangential forces to grind the consumables into a liquefied paste (rough paste or smooth liquid paste) 130, while still preserving the nutrients. Nip rollers R1, R2, R3, R4, R5, and R6, may have a circular cross-section and may extend the width of grinder housing 200. In some embodiments, the larger the width of the nip rollers the higher grinding capacity of the nip rollers to process the consumables and output a very smooth and homogenized liquid paste.

The consumables may pass through a series a nip roller pairs P1, P2, and P3 that sequentially grind the consumables into a finer and finer smooth and homogenized liquid paste 130 along consumable flow path 240. First roller pair P1 may be located next to input 220 and last roller pair P3 may be located next to at least one output 140. FIG. 2A illustrates three roller pairs P1, P2, and P3, but the present disclosure is not so limited, and there may be more or less than three roller pairs.

The arrangement of nip roller pairs may be configured to increase the amount of consumables processed or increase the speed at which consumables are processed. In one embodiment, an additional set of roller pairs may be used in parallel with the first set of roller pairs. Each set of roller pairs may have its own input for introducing the consumables to each set of roller pairs. In this manner, the amount of consumables processed and the speed at which they are processed is increased.

In one embodiment, each roller pair P1, P2, and P3 has a drive roller and an idle roller. For example, the drive rollers in FIG. 2A are R1, R3, and R5 and idle rollers are R2, R4, and R6. Drive rollers R1, R3, and R5 are driven by a drive system 250 that is powered by a motor 260. Motor 260 powers drive system 250 to rotate drive rollers R1, R3, and R5. Each drive roller R1, R3, and R5 may be separately connected to motor 260 or may be connected to another drive roller. For example, FIG. 2A illustrates drive rollers R1 and R3 separately connected to motor 260 with a drive belt, and drive roller R5 is directly connected to driver roller R3 with a different drive belt. Drive rollers R1, R3, and R5 drive idle rollers R2, R4, and R6 by friction. Accordingly, idle rollers R2, R4, and R6 need to be within a predetermined distance from drive rollers R1, R3, and R5 to enable drive rollers R1, R3, and R5 to drive idle rollers R2, R4, and R6. Drive rollers R1, R3, and R5 rotate in one direction (e.g., clockwise) and the idle rollers R2, R4, and R6 rotate the opposite direction (e.g., counter-clockwise) during the grinding process.

Drive system 250 may include a belt, a v-belt, a timing belt, a chain, gears, etc., to attach driver rollers R1, R3, and R5 to motor 260. Motor 260 may be powered by a power source 270. Power source 270 may be a DC power source or an AC power source. For example, in one embodiment power source 270 may include a DC battery that enables grinder 120 to be portable and allows the user to take grinding system with them on the go. In another embodiment, an external power source may be connected to the motor 260 by an external power cord to power motor 260.

In one embodiment, each nip roller in each nip roller pair P1, P2, and P3 rotates at different speeds to generate shear forces in grinding mechanism 230 and to generate different conveying speeds. FIG. 2B illustrates the nip rollers of each nip roller pair P1, P2, and P3 with different sized gears. For example, nip rollers R2, R4, and R6, have a gear G1 with a first diameter and nip rollers R1, R3, and R5 have a gear G2 with a second diameter, different from the first diameter. Each nip roller pair P1, P2, and P3 is connected to each other by multiple drive belts 252. Motor 260 powers drive system 250 which rotates nip rollers R1, R3, and R5. The rotation of nip rollers R1, R3, and R5 rotates nip rollers R2, R4, and R6. The difference in diameter size between G1 and G2 enables the nip rollers in each nip roller pair P1, P2, and P3 to rotate at different speeds.

In another embodiment, the gear diameters for nip rollers R1, R3, and R5 may be different to provide different speed differentials between nip roller pairs. Similarly, the gear diameters for nip rollers R2, R4, and R6 may be different. Accordingly, each nip roller in each nip roller pair P1, P2, and P3 may rotate at different speed differentials to generate differing amounts of shear forces to help crush and grind the consumables and to generate different conveying speeds.

In one embodiment, each nip roller in each nip roller pair P1, P2, and P3 rotates at different speeds to generate shear forces in grinder mechanism 230. This may be accomplished by activating each nip roller in each nip roller pair with a different motor. FIG. 2C illustrates two motors 260 and 262. Motor 260 rotates nip rollers R1, R3, and R5 at a first predetermined speed. Motor 262 rotates nip rollers R2, R4, and R6 by drive system 254 at a second predetermined speed different from the first predetermine speed of nip roller R1, R3, and R5. Accordingly, the speed differential between each nip roller of each nip roller pair P1, P2, and P3 generates shear forces to help crush and grind the consumables and to generate different conveying speeds.

A combination of the above noted features, such as, multiple motors, different sized gears, and multiple drive systems may be used to generate the desired shear forces to help crush and grind the consumables in grinding mechanism 230.

A motor 260 may be utilized to drive any type of cold-press grinding mechanism discussed herein. Motor 260 may drive one or more components of a cold-press grinding mechanism for applying pressure and shear forces to a consumable. For example, motor 260 may drive a component of a cold-press grinding mechanism including a grinding stone, toothed grinding wheels, or a mortar and pestle or mortar and pestle-like mechanism.

Nip rollers may comprise one or more different materials. For example, nip rollers may comprise elastomers, plastic, aluminum, or a combination thereof. Each nip roller may comprise the same material or may comprise different materials. The nip roller material may affect the amount of pressure that is applied by the nip rollers during the crushing and grinding process. For example, a material with a larger Vickers hardness may apply a larger force during the grinding process than a material with a smaller Vickers harness. The materials for each nip roller pair P1, P2, and P3 may also vary in series. For example, roller pair P3 may be fabricated from the hardest material compared to the other roller pairs P1 and P2 so that roller pair P3 may apply the most force to the consumables right before the consumables are outputted. Alternatively, roller pair P1 may be fabricated from the hardest material compared to the other roller pairs P2 and P3 so that roller pair P1 may apply the most force to the consumables right as the consumables enter consumable flow path 240. The nip rollers R1, R2, R3, R4, R5, and R6 may have different surface roughness it could be very smooth surface or even knurled. In one embodiment, roller pairs P1, P2, and P3 may be arranged in a manner to grind and crush Khai-Nam. First roller pair P1 may be designed to break the consumable structure and tissue. Second roller pair P2 may be designed to grind the consumable to tiny particles. Third roller pair P3 may be designed to crush the consumable to the desired homogenous mash. Accordingly, different materials and surface roughness may be selected for the desired friction force for each roller pair, and the nip rollers may be arranged accordingly to add the shear forces and/or pressure forces needed for each step.

Figure 4:
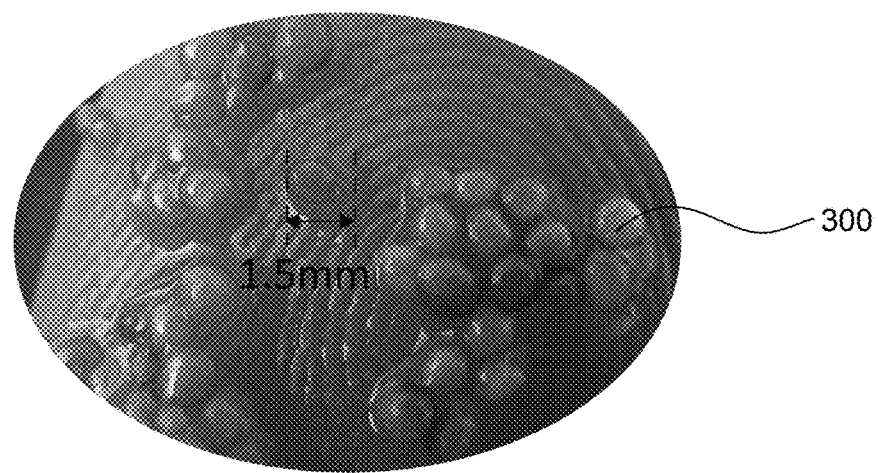
FIG. 4 illustrates an exemplary aquatic plant for grinding according to an embodiment.

FIG. 3 illustrates grinder 120 attached to container 110 with an aquatic plant 300, such as Khai-Nam (illustrated in FIG. 4), being processed by grinding mechanism 230. Grinding system 100 is turned upside down and aquatic plant 300 passes through funnel 224 of input 220. The series of nip roller pairs P1, P2, and P3 grind aquatic plant 300 and resultant paste (rough paste or smooth liquid paste) 130 is outputted through at least one output 140. In some embodiments, aquatic plant 300 itself may act as a lubricant for nip rollers. Further, FIG. 3 illustrates grinding system 100 without valve 222.

Figure 5:
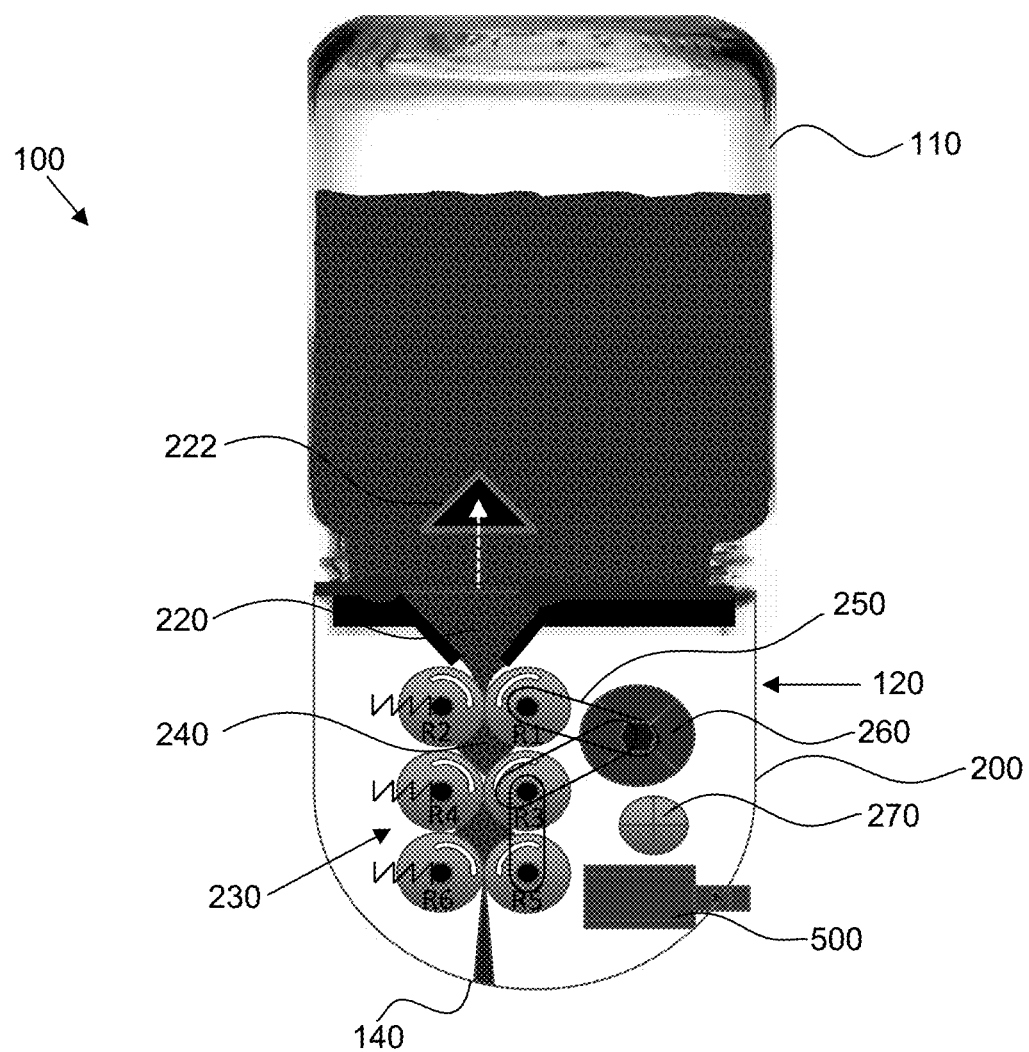
FIG. 5 illustrates a schematic drawing of a grinder attached to a container with a control valve according to an embodiment.

FIG. 5 illustrates a control valve 500 that allows the user to regulate the serving size by regulating the operation duration (e.g., the amount of time motor 260 powers grinding mechanism 230). Control valve 500 may include various settings to enable the user to select the amount of time motor 260 powers grinding mechanism 230, which determines the amount of paste (rough paste or smooth liquid paste) 130 produced. For example, control valve 500 may include short, medium, and long duration settings. For example, the short duration setting may last for 1 minute, medium duration setting may last for 2 minutes and long duration setting may last for 3 minutes.

FIGS. 6-8 illustrate the process of using grinding system 100. FIG. 6 illustrates container 110 with consumables already within. The consumables may be placed in container 110 by the user or the user may purchase a pre-sealed container 110 with consumables within. For example, pre-sealed container 110 may have a foil seal 600 that preserves the freshness and quality of consumables within.

FIG. 7 illustrates grinder 120 attached to container 110. As discussed previously, when grinder 120 is attached to container 110, mechanical seal 212 is created between grinder 120 and container 110 which prevents the consumables from leaking out of container 110.

Valve 222 may serve as a piercer for piercing an opening in foil seal 600. Valve 222 may be shaped to form an apex to pierce foil seal 600 as grinder housing 200 is attached to container 110. In addition, grinder 120 may also form a vacuum seal between grinder 120 and container 110 to preserve the consumables within container 110.

After grinder 120 has been attached to container 110, the user may begin the grinding process. For example, as illustrated in FIG. 8, the user may turn grinding system 100 upside down. Once grinding system 100 is upside down, gravity pulls and guides the consumables toward input 220. To begin the grinding process, the user opens valve 222 and gravity leads the consumables through funnel 224 of input 220. Funnel 224 gradually meters the flow of the consumables to grinding mechanism 230 where the plurality of nip rollers R1, R2, R3, R4, R5, and R6 grind the consumables into paste (rough paste or smooth liquid paste) 130.

Valve 222 may be opened by user actuation or automatically. In one embodiment, the user may actuate a button 800 to open valve 222 which moves valve 222 in a first direction A1. Valve 222 may remain open until user releases button 800 or presses button 800 again, which closes valve 222. Valve 222 closes by moving in the opposite direction and returns to its original closed position. Grinding duration (i.e., the time valve 222 is open) may be previously set by the user (i.e., control valve) for a predetermined amount of time.

Setting a grinding duration for a predetermined amount of time may produce consistent, repeatable dispensing of a desired amount of consumable. For example, a grinding duration set at a predetermined amount of time may consistently and repeatedly dispense a predetermined amount of consumable, such as a specific volume of liquid paste. As a non-limiting example, a grinding duration may be set at a predetermined amount of time to dispense a predetermined number of ounces of liquid paste, for example, one ounce of liquid paste. Upon actuation of valve 222, valve 222 may remain open and the grinding operation may occur for the predetermined amount of time to dispense the predetermined amount of consumable. Exemplary predetermined amounts of time include, but are not limited to, 5 seconds, 10 seconds, 20 seconds, 30 seconds, or within any range having any two of these values as endpoints. In some embodiments, the predetermined amount of time may be at least 5 seconds, 10 seconds, 20 seconds, or 30 seconds.

In another embodiment, the operation of valve 222 may be based upon the orientation of grinding system 100. For example, grinder 120 may include a sensor 810 for determining the current orientation of grinding system 100. For example, sensor 810 may be an accelerometer, gyroscope, magnetometer, gravitational sensor, or any other suitable mechanism for determining the orientation of grinding system 100. When grinder 120 is upright (e.g., grinder 120 is vertically oriented above container 110), or only partially tilted (e.g., the angle between the grinding system and the horizontal is greater than 0 degrees and less than 90°), valve 222 remains closed. When grinding system 100 is upside down or tilted to a predetermined angle (e.g., grinding system 100 is tilted more than 90°), valve 222 opens, thus enabling the grinding process to begin. In this manner, the user does not need to take additional active steps to begin the grinding process other than tilting grinding system 100 a predetermined angle to open valve 222. The user may close valve 222 by tilting grinding system 100 to less than the predetermined angle (e.g., less than 90°).

In another embodiment, grinder 120 may further include a valve lock to lock valve 222 in a closed position so that valve 222 does not open accidentally. For example, if the user places grinding system 100 in a bag that may cause the orientation of grinding system 100 to change during transit, valve lock may lock valve 222 in a closed position to prevent spills.

As discussed previously, the distance between the drive roller R1, R3, and R5 and the idle roller R2, R4, and R6 of each roller pair P1, P2, and P3, determines the amount of force applied to the consumables by nip roller pairs P1, P2, and P3 during the grinding process. The distance between the drive roller R1, R3, and R5 and the idle roller R2, R4, and R6 may be established during the manufacturing process or may be regulated by the user before use.

FIGS. 9 and 10 illustrate a loading mechanism or biasing mechanism 900 for adjusting the distance between drive rollers R1, R3, and R5 and idle rollers R2, R4, and R6. Drive rollers R1, R3, and R5 may be fixed in a predetermined location within grinder housing 200. The position of idle rollers R2, R4, and R6 may be adjusted to alter the distance between drive rollers R1, R3, and R5 and idle rollers R2, R4, and R6. Each idle roller R2, R4, and R6 may be connected to a biasing member 902, 904, and 906 that adjusts the position of idle roller R2, R4, and R6 and thereby alters the distance between the drive roller R1, R3, and R5 and the idle roller R1, R3, and R5. Biasing members 902, 904, and 906 may be a spring, elastic strap or other similar device.

Loading 900 may have various settings for adjusting the distance or the load between the driver rollers R1, R3, and R5 and idle rollers R2, R4, and R6. A first setting of loading mechanism 900 may be a maximum distance D1 between drive rollers R1, R3, and R5 and idle rollers R2, R4, and R6, as illustrated by FIG. 9. When the distance between drive rollers R1, R3, and R5 and idle rollers R2, R4, and R6 is at a maximum, no force or a minimal amount of force is applied to the consumables by the nip rollers during the grinding process. In this manner, the consumables receive little to no processing and grinder 120 outputs the consumables in a substantially unaltered state, i.e., "as is," as illustrated in FIG. 1B. This setting may be beneficial if the user desires little processing to the original consumables. For example, certain aquatic plants, such as, Khai-Nam, may be consumed with no processing.

A second setting of loading mechanism 900 may be a minimum distance D2 between the drive roller R1, R3, and R5 and idle rollers R2, R4, and R6, as illustrated by FIG. 10. When the distance between drive rollers R1, R3, and R5 and idle rollers R2, R4, and R6 is at a minimum, a maximum amount of force is applied to the consumables by the nip rollers during the grinding process. In this manner, the consumables are processed to a paste 130 of different thicknesses (rough paste or smooth liquid paste).

In another embodiment, loading mechanism 900 may further include additional settings between the maximum and minimum settings discussed. These additional settings allow the user to select a force less than the maximum force to be used, but still enable grinding mechanism 230 to grind the consumables to the user's preferred consistency.

Loading mechanism 900 may also affect the position of each idle roller R2, R4, and R6 differently. For example, the distance between the drive roller and the idle roller of each roller pair P1, P2, and P3 may be different from each other. In one embodiment, the distance for roller pair P1 may be the greater than roller pairs P2 and P3 and the distance for roller pair P3 may be the smaller than roller pairs P1 and P2. In this manner, roller pairs P1, P2, and P3 may also act as a secondary funnel for the consumables to at least one output 140.

Figure 11:
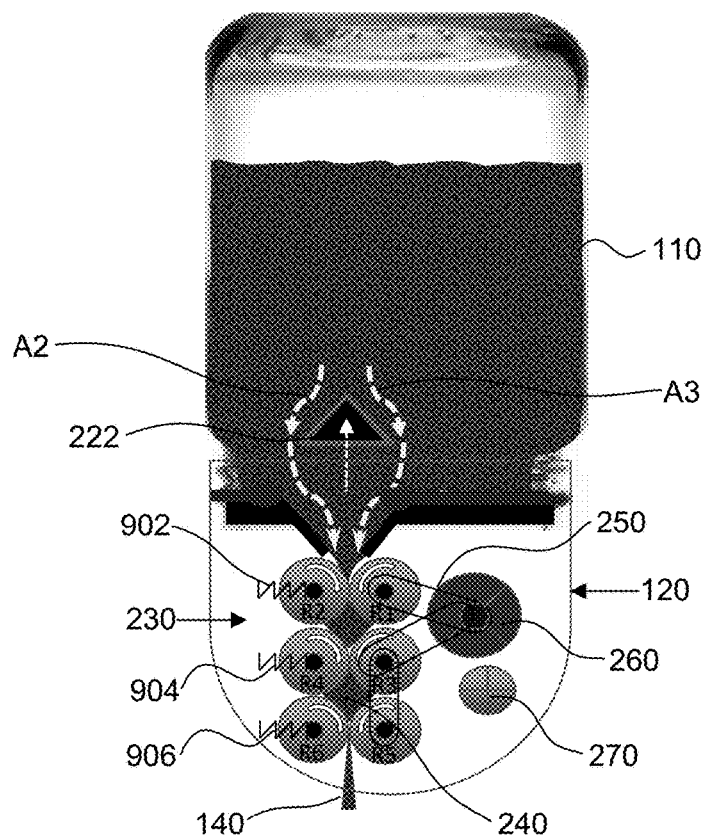
FIG. 11 illustrates a schematic drawing of a grinder attached to a container with a valve acting as a consumable valve to guide consumables to an input according to an embodiment.

FIG. 11 illustrates another exemplary embodiment of grinding system 100 in which valve 222 may also function as a consumable valve to force and guide the consumables to input 220. Valve 222 opens when it moves in first direction A1 and allows the consumables to enter consumable flow path 240. The consumables flow around valve 222 as illustrated by arrows A2 and A3. Some consumables used in grinding system 100 may have a tendency to adhere or clump together. For example, some aquatic plants, such as Khai-Nam, tend to adhere together in aggregate, which may slow the grinding process. Accordingly, valve 222 may move in such manner as to break up the aggregate so that the consumables may flow more easily through consumable flow path 240.

Figure 12:
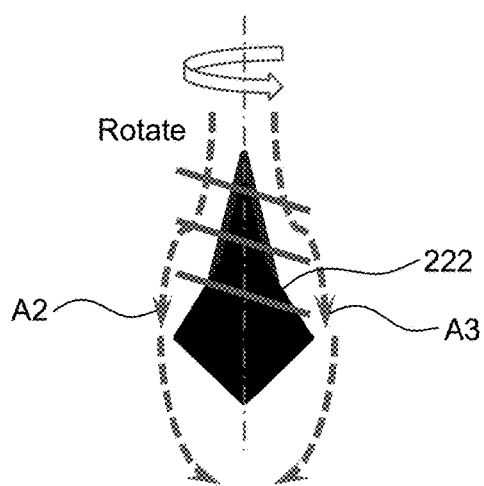
FIG. 12 illustrates rotational movement of a consumable valve according to an embodiment.

FIG. 12 illustrates exemplary rotational movement of valve 222 acting as a consumable valve. When the grinding process beings, valve 222 opens input 220 and allows the flow of the consumables to consumable flow path 240. Once valve 222 opens, valve 222 may begin to rotate about axis AX1 of valve 222. The rotation of valve 222 helps break up the aggregate as the aggregate come in contact with valve 222.

Figure 13:
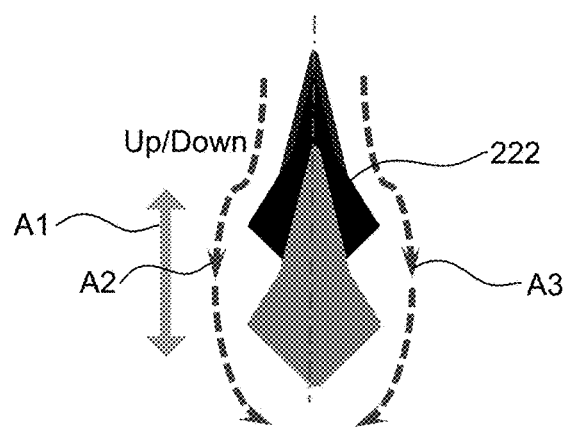
FIG. 13 illustrates translational movement of a consumable valve according to an embodiment.

FIG. 13 illustrates another exemplary translational movement of valve 222 acting as a consumable valve. When the grinding process begins, valve 222 opens input 220 to allow the flow of the consumables to consumable flow path 240. Once valve 222 opens, valve 222 may begin to move back and forth along direction A1. Valve 222 does not return to its original closed position, but valve 222 may move a portion of the distance back to its original closed position. This reciprocating movement causes valve 222 to function as a sort of hammer to break up the clumps as the come in contact with valve 222. Any type of rotational movement, translational movement, reciprocal movement, or combination thereof, may be employed by valve 222 to help break up the clumps of the consumables. For example, the rotational movement of valve 222 of FIG. 12 may be used in combination with the reciprocating movement of FIG. 13.

Grinder 120 may be cleaned in a variety of different manners. For example, a cleaning solution, such as water, may be placed in container 110, and the user may use grinding system 100 in normal operation. For example, valve 222 opens and allows the water to pass through grinding mechanism 230 along consumable flow path 240 to clean consumable flow path 240.

Figure 14:
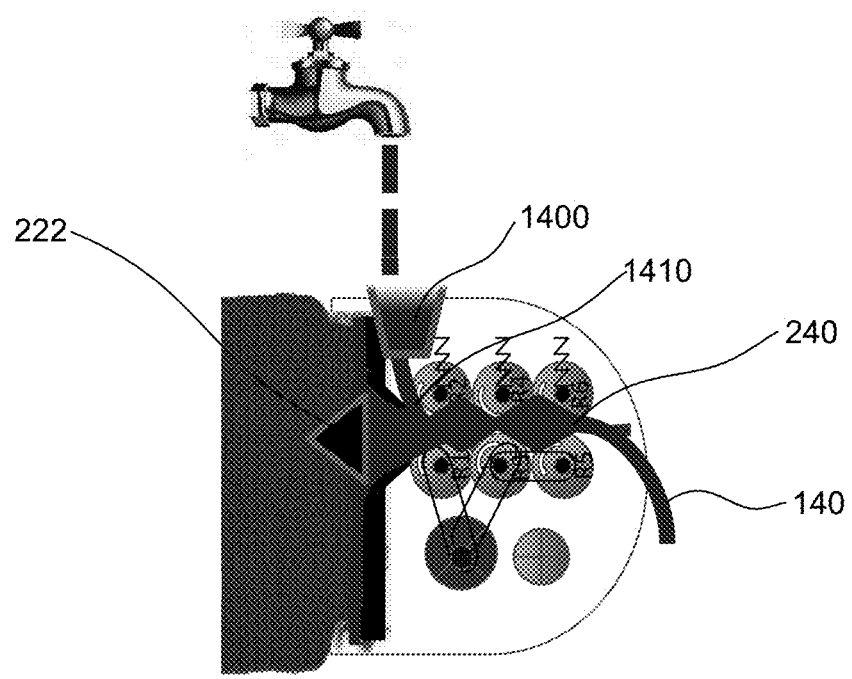
FIG. 14 illustrates a secondary input for cleaning a grinding system according to an embodiment.

In one embodiment, if container 110 contains consumables for later grinding, grinder 120 may further include a secondary input 1400 for cleaning purposes. FIG. 14 illustrates secondary input 1400 that is located on a sidewall of grinder 120. Secondary input 1400 is connected to a cleaning flow path 1410 that is orthogonal to consumable flow path 240. Cleaning flow path 1410 connects to consumable flow path 240 and enables the cleaning solution, such as water, to easily pass through cleaning flow path 1410 and access consumable flow path 240. Valve 222 remains closed so that consumables do not enter the flow path during cleaning. For example, valve 222 may be locked in a closed position to prevent valve 222 from opening. The user may pour the cleaning solution into secondary input 1400 and cleaning solution flushes consumable flow path 240 and the cleaning solution exits at least one output 140. Accordingly, the user may clean consumable flow path 240 when consumables are within container 110, thus enabling the user to clean grinder 120 after each use without removing grinder 120 from container 110.

Secondary input 1400 may be disposed at an angle relative to input 220 of a grinder. In other words, secondary input 1400 may not be disposed parallel to input 220. In some embodiments, secondary input 1400 may be disposed at an angle between 30 degrees and 150 degrees relative to input 200. In some embodiments, secondary input 220 may be disposed orthogonal to input 220 (i.e., at a 90-degree angle).

Grinding system 100 is designed to enable a user to enjoy portable grinding on the go at their own convenience. As described previously, grinding system 100 includes grinder 120 and container 110. Grinder 120 may be able to attach to a variety of different sized containers, offering the user container variety. The size of grinding system 100 is dependent on the size of container 110. Grinding system 100 is designed to fit within the palm of an average's user hand which makes grinding system 100 easy to use. Since grinding system 100 fits in the average's user hand, the amount of paste (rough paste or smooth liquid paste) prepared by a handheld container may be limited. However, larger batches of paste (rough paste or smooth liquid paste) may be processed by using a larger container and gripping grinding system 100 with both hands.

Each container 110 may have its own lid. Grinder 120 may be exchanged from one container to another container. The user may also place their own consumables, (e.g., fruits, vegetables, aquatic plants, etc.) in container 110 for grinding or the user may simply buy a pre-prepared container that already has consumables inside. The pre-prepared containers may be sealed by foil seal 600, as discussed in FIG. 6. Foil seal 600 preserves the freshness of consumables within the container.

Grinding system 100 may be powered by a portable power source, such as a rechargeable battery. Since grinder 120 is powered by a battery, the user may take grinding system on the go enabling the user to paste (to a rough paste or smooth liquid paste) wherever they want.

The removable attachment of grinder 120 to container 110 means that grinder 120 may serve as a multiuse removable lid for container 110. In other words, grinder 120 may be a lid for container 110 that is configured to grind consumables held within container 110 as discussed herein. In some embodiments, containers 110 may be pre-packaged and sealed containers holding consumables. In some cases, a consumer may purchase a grinder 120 that serves a lid for one or more pre-packaged containers 110 purchased online or at a store. Grinder 120 may be removably attached to pre-packaged containers 110 in succession. For example, once all the consumables of a first container 110 have been exhausted, grinder 120 may be removed from the first container 110 and removably attached to a second container 110 for grinding and dispensing of consumables from the second container 110 until those consumables are exhausted, and so on. The replaceable nature of containers 110 allows a consumer to purchase a single grinder 120 for use on multiple containers 110. After purchasing a grinder 120, a consumer may purchase containers 110 for use with grinder 120. In some embodiments, a grinder 120 and one or more containers 110 may be purchased as a set. In some embodiments, grinder 120 and container(s) 110 may be purchased separately.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventors, and thus, are not intended to limit the present invention and the appended claims in any way.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A handheld grinder for aquatic plants, the handheld grinder comprising:
    a container containing aquatic plants;
    a grinder with a housing that is removably attachable to the container, wherein the housing is configured to be received in a user's hand, the grinder comprising:
        an input for receiving the aquatic plants of the container;
        a grinding mechanism configured to grind the aquatic plants of the container by applying pressure and shear forces to the aquatic plants;
        a valve to control the flow of the aquatic plants of the container to the grinding mechanism; and
        an output to output a liquid paste prepared by grinding the aquatic plants; and
    a motor that drives the grinding mechanism,
    wherein the grinding mechanism is disposed between the input and the output along an aquatic plant flow path,
    wherein the valve opens to allow a first portion of the aquatic plants to enter the aquatic plant flow path,
    wherein the motor drives the grinding mechanism to grind the first portion of aquatic plants within the aquatic plant flow path, and
    wherein the valve closes to prevent a second portion of the aquatic plants from entering the aquatic plant flow path.

2. The handheld grinder of claim 1, wherein the grinder only has a single output to output the liquid paste.

3. The handheld grinder of claim 1, wherein the grinding mechanism comprises a plurality of nip roller pairs.

4. The handheld grinder of claim 3, wherein the nip roller pairs are arranged between the input and the output of the grinder.

5. The handheld grinder of claim 3, wherein the distance between the rollers of each roller pair is the same as the other roller pairs during a grinding process.

6. The handheld grinder of claim 3, wherein the distance between the rollers of each roller pair is different than the other roller pairs during a grinding process.

7. The handheld grinder of claim 3, wherein one roller of each roller pair is biased by a biasing member, and
    wherein the biasing member controls the distance between the rollers of each roller pair.

8. The handheld grinder of claim 1, wherein the input includes a funnel to gradually introduce the aquatic plants of the container to the grinding mechanism.

9. The handheld grinder of claim 1, wherein the valve is configured to pierce a seal of the container.

10. The handheld grinder of claim 1, wherein the valve rotates to control the flow of the aquatic plants of the container to the grinding mechanism.

11. The handheld grinder of claim 1, wherein the valve moves from a first position to a second position to control the flow of the aquatic plants of the container to the grinding mechanism.

12. The handheld grinder of claim 1, wherein a predefined measure of the first portion of the aquatic plants is conveyed along the aquatic plant flow path without being crushed or ground by the grinding mechanism.

13. The handheld grinder of claim 1, wherein a top of the grinder housing and a bottom of the container is adapted to fit within a user's hand.

14. The handheld grinder of claim 1, further comprising a secondary input, wherein the secondary input is disposed at an angle relative to the input.

15. The handheld grinder of claim 1, further comprising an orientation sensor, wherein the orientation sensor detects the orientation of the handheld grinder and opens the valve when the handheld grinder tilts more than a predetermined angle.

16. The handheld grinder of claim 1, wherein the motor drives the grinding mechanism for a predetermined amount of time to grind the first portion of the aquatic plants and produce a predetermined amount of liquid paste.

17. The handheld grinder of claim 1, wherein the grinding mechanism comprises a plurality of nip roller pairs comprising nip rollers, and wherein the motor drives a plurality of the nip rollers of the nip roller pairs for a predetermined amount of time to produce a predetermined amount of liquid paste.

18. The handheld grinder of claim 1, wherein the aquatic plants comprise aquatic plants from the Lemnaceae family.

19. The handheld grinder of claim 1, wherein the aquatic plants comprise at least one of: *Spirodela* plants, *Landoltia* plants, *Lemna* plants, *Wolffiella* plants, or *Wolffia* plants.

20. The handheld grinder of claim 1, further comprising a button, wherein the button is configured to open the valve to allow the first portion of the aquatic plants to enter the aquatic plant flow path and activate the motor to grind the first portion of aquatic plants within the aquatic plant flow path.

21. A handheld grinder for aquatic plants, the handheld grinder comprising:
a container containing aquatic plants;
a grinder with a housing that is removably attachable to the container, wherein the housing is configured to be received in a user's hand, the grinder comprising:
an input for receiving the aquatic plants of the container and comprising a valve to control the flow of the aquatic plants of the container to the grinding mechanism;
a grinding mechanism configured to grind the aquatic plants of the container by applying pressure and shear forces to the aquatic plants; and
an output to output a liquid paste prepared by grinding the aquatic plants; and
a motor that drives the grinding mechanism,
wherein the valve is configured to pierce a seal of the container.

22. A handheld grinder for aquatic plants, the handheld grinder comprising:
a container containing aquatic plants;
a grinder with a housing that is removably attachable to the container, wherein the housing is configured to be received in a user's hand, the grinder comprising:
an input for receiving the aquatic plants of the container;
a grinding mechanism configured to grind the aquatic plants of the container by applying pressure and shear forces to the aquatic plants; and
an output to output a liquid paste prepared by grinding the aquatic plants; and
a motor that drives the grinding mechanism,
wherein the grinding mechanism is disposed between the input and the output along an aquatic plant flow path, and wherein a predefined measure of the aquatic plants is conveyed along the aquatic plant flow path without being crushed or ground by the grinding mechanism.

23. A handheld grinder for aquatic plants, the handheld grinder comprising:
a container containing aquatic plants;
a grinder with a housing that is removably attachable to the container, wherein the housing is configured to be received in a user's hand, the grinder comprising:
an input for receiving the aquatic plants of the container;
a grinding mechanism configured to grind the aquatic plants of the container by applying pressure and shear forces to the aquatic plants;
a secondary input disposed at an angle relative to the input; and
an output to output a liquid paste prepared by grinding the aquatic plants; and
a motor that drives the grinding mechanism.

24. A handheld grinder for aquatic plants, the handheld grinder comprising:
a container containing aquatic plants;
a grinder with a housing that is removably attachable to the container, wherein the housing is configured to be received in a user's hand, the grinder comprising:
an input for receiving the aquatic plants of the container;
a grinding mechanism configured to grind the aquatic plants of the container by applying pressure and shear forces to the aquatic plants; and
an output to output a liquid paste prepared by grinding the aquatic plants; and
a motor that drives the grinding mechanism; and
an orientation sensor, wherein the orientation sensor detects the orientation of the handheld grinder and opens a valve when the handheld grinder tilts more than a predetermined angle.

* * * * *